(12) United States Patent
Verlage et al.

(10) Patent No.: US 6,874,921 B2
(45) Date of Patent: Apr. 5, 2005

(54) LIGHTING ARRANGEMENT FOR THE IGNITION LOCK OF A MOTOR VEHICLE

(75) Inventors: Alwin Verlage, Rommerskirchen (DE); Lars Baumgarten, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/121,357

(22) Filed: Apr. 12, 2002

(65) Prior Publication Data

US 2002/0154511 A1 Oct. 24, 2002

(30) Foreign Application Priority Data

Apr. 18, 2001 (DE) .......................................... 101 19 010

(51) Int. Cl.$^7$ ................................................ B60Q 1/00
(52) U.S. Cl. ........................ 362/487; 362/488; 362/489; 362/549; 362/511; 362/501; 362/29; 362/30; 362/26; 362/32; 385/31
(58) Field of Search ................................. 362/487, 488, 362/489, 549, 511, 501, 29, 30, 26, 32; 385/31

(56) References Cited

U.S. PATENT DOCUMENTS

| | | | |
|---|---|---|---|
| 4,079,242 A | | 3/1978 | Seibel |
| 5,365,413 A | * | 11/1994 | Krammer .................... 362/464 |
| 5,432,876 A | * | 7/1995 | Appeldorn et al. ........... 385/31 |
| 5,729,057 A | * | 3/1998 | Frenzel et al. ............. 307/10.3 |
| 5,928,539 A | | 7/1999 | Thivet |

FOREIGN PATENT DOCUMENTS

| | | |
|---|---|---|
| DE | 37 04 469 A1 | 3/1986 |
| EP | 0 448 501 A1 | 9/1991 |
| EP | 0 475 146 A1 | 3/1992 |

* cited by examiner

*Primary Examiner*—Sandra O'Shea
*Assistant Examiner*—Bertrand Zeade
(74) *Attorney, Agent, or Firm*—Brinks Hofer Gilson & Lione

(57) ABSTRACT

A lighting arrangement for the ignition lock of a motor vehicle has a light ring comprising a translucent material and fitted on to the housing of an engine immobilizer of the vehicle. Light-guide extensions in leg form lead to the light ring from light emitting diodes on the circuit board of the immobilizer. Preferably arranged at the side of the light ring which is towards the ignition lock are notches for producing a light-dark pattern, wherein the notch depth and position can vary for the purposes of producing a uniform emission of light.

9 Claims, 1 Drawing Sheet

LIGHTING ARRANGEMENT FOR THE IGNITION LOCK OF A MOTOR VEHICLE

FIELD OF THE INVENTION

The invention generally concerns a lighting arrangement for an ignition lock of a motor vehicle.

BACKGROUND OF THE INVENTION

A typical lighting arrangement for a motor vehicle ignition lock includes a light ring which comprises a light-guiding material. The light ring surrounds the ignition lock and has light-guide extensions leading to a light source to feed light to the light ring.

A lighting arrangement of that kind can be found in EP 0 475 146 A1. It comprises a sleeve-shaped light ring which extends around the ignition lock of a motor vehicle to produce a homogeneous lighting effect, and a cover which is releasably secured to the light ring and which extends around it in positively locking relationship. Integrated into the cover is a lamp housing for accommodating a lamp serving as the light source. The light of the lamp is deflected through 90° by way of light-deflecting prisms and introduced into the light ring by way of light-introducing limbs.

A similar lighting arrangement for an ignition lock is to be found in DE 37 04 469 A1. In the lighting arrangement therein, the lamp housing is formed integrally on the light ring body, while once again a prism-like arrangement is provided for introduction of the light from the lamp into the light ring.

DE 25 35 080 B1, EP 0 448 501 A1 and DE 197 56 701 A1 also disclose lighting arrangements for the cigarette lighter of a motor vehicle. Those arrangements generally also have a light ring and a lamp housing, wherein the light from the lamp is passed to the light ring by prisms or similar devices.

A disadvantage with the above-discussed arrangements is that they require a considerable amount of space in the region of the ignition lock, by virtue of the presence of the lamp which is to be disposed in the proximity of the light ring. Frequently therefore there is no longer sufficient space for arrangements of that kind in modern motor vehicles with an immobilizer fitted to the ignition lock. Those electronic immobilizers include a device for recognizing a code individually associated with an ignition key, and an electronic control system which permits the motor vehicle to be started only when the appropriate code of the ignition key has been recognized. In general immobilizers have a coil and a transponder in order to be able to interrogate the code stored in the ignition key.

BRIEF SUMMARY OF THE INVENTION

An object of the present invention is to propose a compact lighting arrangement for the ignition lock of a motor vehicle.

Another object of the invention is to provide an ignition lock lighting arrangement which is easy to fit and permits fitting thereof jointly with an immobilizer on the ignition lock.

In accordance with the invention the foregoing and other objects are attained by a lighting arrangement which includes a light ring which comprises a light-guiding material. The light ring is disposed around the ignition lock and is connected to a light source by way of at least one light-guide extension. The light source is disposed in the housing of an immobilizer which is also arranged at the ignition lock.

It will be seen in greater detail from an embodiment described hereinafter that the light which is supplied from the light source by way of the light-guide extension is delivered by the light ring uniformly around the ignition lock in order to light it homogeneously and in a dazzle-free manner.

The lighting arrangement according to the invention can thus provide for dovetailing of the lighting effect and the immobilizer, which in the constricted space around the ignition lock makes it possible to achieve a considerable saving in space. By virtue of the light source being disposed in the housing of the immobilizer, not only is a saving made in respect of a separate lamp housing, but also the electrical feed lines which are provided in any case for the immobilizer are advantageously used for supplying power to the light source. There is therefore no longer any need for specific electrical supply lines to the light source.

In a preferred feature the light source can be formed by at least one surface-mounted light emitting diode (SMD-LED) on the circuit board of the immobilizer. A circuit board is generally already provided in electronic immobilizers for carrying the electronic control system. Therefore, at minimum cost and manufacturing expenditure, it is possible for one or more light emitting diodes to be additionally arranged on the circuit board and supplied with power. It is also advantageous in that respect that light emitting diodes are distinguished by a low level of current consumption with a high light yield.

Preferably the lighting arrangement also has a housing cover for the immobilizer, which has an annular ring extension which partially covers the light ring. That ring extension extends around the light ring as a holding means and as a shielding means which suppresses the emission of light in unwanted directions. In that case, the one-piece construction of that cover member over the light ring with the housing cover of the immobilizer affords an inexpensive design configuration for the lighting arrangement as only a single component has to be produced and fitted for the immobilizer and the light ring. The operation of fixing the cover member can also be simplified as it overall only has to be fixed at one or a few locations. That can be done for example by latching engagement into the housing of the immobilizer.

Preferably the ring extension on the housing cover, which extends around the light ring, is of a reflecting configuration at the side which is towards the light ring. For example, the side towards the light ring may have a white coating or color. That maximizes the light yield from the light ring as light which issues in the direction of the cover member is reflected back into the light ring by the surface of the cover member and is thus available again for emission to the ignition lock.

The light-guide extension or extensions connecting the light ring and the light source preferably communicate substantially tangentially with the light ring. That provides that the light which is directly substantially in the direction of the light-guide extensions also passes virtually tangentially into the light ring and therefore can cover therein a maximum possible distance. That can also provide that an adequate amount of light for emission on to the ignition lock can still be provided even at a relatively great distance from the point of entry of the light into the light ring.

In terms of designing the light-guide extensions, it is to be noted that they also have only very limited space available to them, precisely by virtue of the compact configuration which is afforded by virtue of the combination with an immobilizer. Therefore neither large radii nor deflection prisms are generally possible. Preferred light-guide extensions which satisfies those demands are substantially in the form of legs, wherein the leg can be of an approximately circular and/or oval cross-section.

A development of this configuration of the light-guide extensions provides that a leg-shaped light-guide extension of that kind includes a primary leg and a secondary leg, wherein the primary leg firstly extends alone from the light source in the direction of the light ring and the secondary leg branches off the primary leg in the proximity of the light ring. That secondary leg preferably opens into the light ring in the opposite direction to the primary leg. In particular the primary leg and the secondary leg can open tangentially into the light ring, in which case one of the tangents opens into the light ring in the clockwise direction and the other in the anti-clockwise direction. In that case the directions are defined by the direction of the light flow in use of the apparatus.

When the LED is of sufficient brightness however it is also possible to provide only a primary leg without a secondary leg.

In accordance with another preferred feature of the lighting arrangement the light ring has notches, by means of which a light-dark pattern is produced on the ignition lock. In that arrangement the notches are preferably provided at the rear side of the light ring, which is towards the ignition lock.

The depth and/or position of the notches is preferably not identical at every location on the light ring but may vary in accordance with the distribution of light which is to be afforded when light is shone therein. Without notches that distribution of light will not be uniform around the light ring, but will involve a maximum in the proximity of the light-guide extensions and a minimum at the greatest distance therefrom. By means of a suitable choice in respect of the depth and position of the notches however it is possible to correct that irregular light distribution to the effect that substantially uniform emission of light is achieved around the entire light ring.

DESCRIPTION OF THE PREFERRED EMBODIMENT

Figure 1:
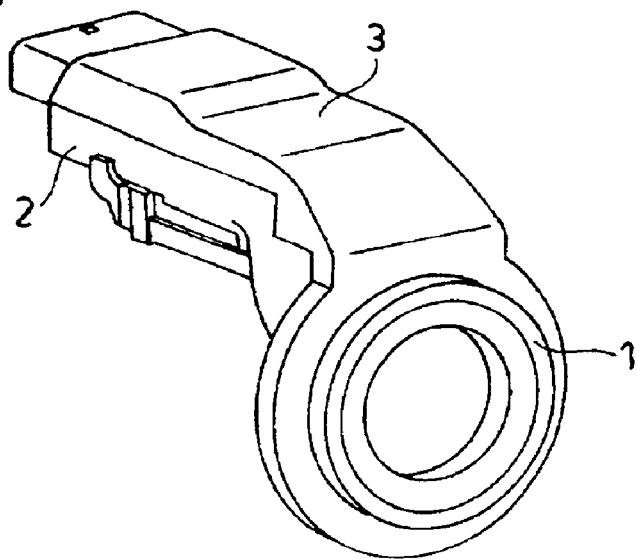
FIG. 1 shows a perspective view of the overall lighting arrangement in the assembled condition.

Referring firstly to FIG. 1 the assembly shown therein for an ignition lock (not shown) of a motor vehicle represents a combination of an ignition lock lighting arrangement with an immobilizer. The immobilizer has a housing 2, a coil (not shown) and a circuit board indicated at 8 in FIG. 3 for receiving an electronic control system. Such a module of an electronic mobilize is pushed in known manner in latching engagement on to the housing of an ignition lock (not shown).

Figure 3:
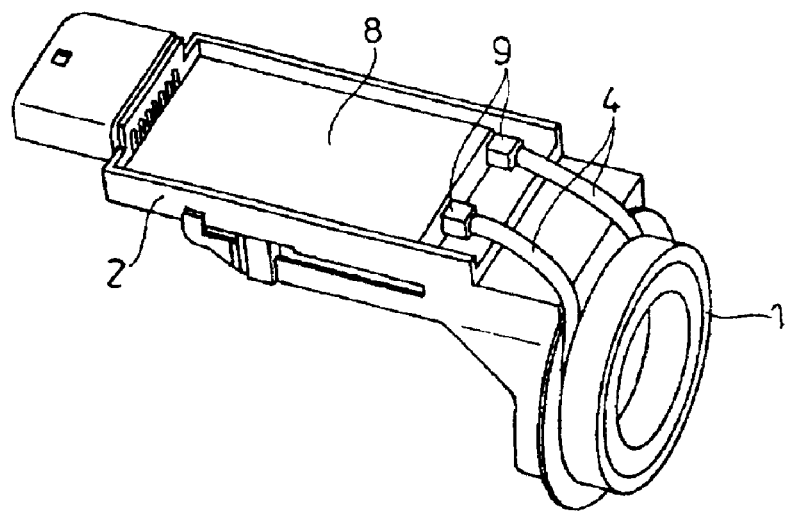
FIG. 3 shows a perspective view of the lighting arrangement with the cover of the housing of the immobilizer removed.

As can be seen in particular from FIG. 3, in accordance with the invention a light ring 1 of light-guiding material is mounted releasably to the housing 2 of the immobilizer. The immobilizer and the light ring 1 are jointly covered by a housing cover shown at 3 in FIG. 1 which can be fitted by latching engagement into the housing 2 of the immobilizer. An annular extension of the housing cover 3 in that case extends around the light ring in positively locking relationship therewith in order to fix it and to prevent light from being emitted in unwanted directions. The annular extension of the housing cover 3 can preferably be made from a white plastic material or can be coated white at its inside which is towards the light ring 1. In that way the light issuing from the light ring 1 is at least partially reflected back into the light ring 1 again so that the light losses can be kept down.

Both the light ring 1 and also the housing cover 3 can be connected to the housing 2 of the immobilizer by a clamping or detent fit. That simplification can afford considerable advantages in terms of manufacture and assembly.

As can also be seen from FIG. 3, two surface-mounted light emitting diodes 9 which can also for brevity be referred to as SMD-LEDs are arranged on the circuit board 8 of the immobilizer. The provision of two light emitting diodes is preferred, governed by the structural space involved, by virtue of the way in which the wiring of the electrical coil (not shown) of the immobilizer is laid. Equally however it would also be possible to provide only one light emitting diode.

The light emitting diodes 9 are in contact with light-guide extensions 4 in the form of legs, which go to the light ring 1 and which are formed in one piece therewith. The light-guide extensions 4 each have an end of circular or oval cross-section and disposed in each case at the associated light emitting diode 9 and of such a size that it covers the emitted light cone from the respective light emitting diodes. The light-guide extensions 4 divert the axially issuing light from the light emitting diodes 9 as uniformly as possible but without diverting prisms from the horizontal direction into the vertical direction in order then to pass the light into the light ring 1. In that case, the light-guide extensions involve a shallow contour and radii which are as large as possible.

Figure 2:
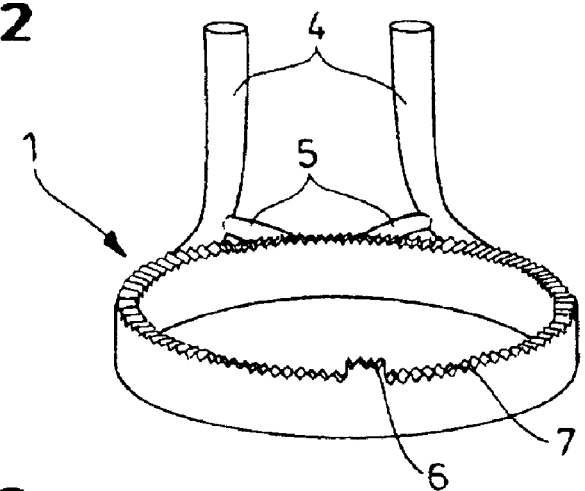
FIG. 2 shows a perspective view of the light ring separately.

As can be seen in particular from FIG. 2, branching from each of the two primary legs 4 in the proximity of the light ring 1 is a respective secondary leg 5 which opens tangentially into the light ring 1 in the opposite direction to the primary leg 4. The light which is supplied to the light ring from the light emitting diode by way of the primary leg 4 is thus divided up and introduced into the light ring 1 in two different directions.

It can also be seen from FIG. 2 that the light ring 1 has V-shaped notches 7 at its side which is towards the ignition lock, being upward in FIG. 2. Those notches serve to produce a light-dark pattern on the ignition lock. In that arrangement, the depth and/or position of the notches 7 is adapted to the distribution of light along the light ring 1 in such a way that the emission of light along the light ring 1 affords the person viewing same substantially a uniform light-dark pattern over the entire surface area of the light ring. As the level of intensity of the light is higher in particular in the region of the transition of the light-guide extensions 4, 5 into the light ring 1, the notches are shallower here. In the rest of the region of the light ring 1 the notches 7 are of substantially the same depth. In addition, in the region of the light-guide extensions 4, 5, in relation to the elevated surface, with respect to the base surface of the ring, the notches are no longer flat but are arranged inclinedly in space. In part the notches 7 are of lesser depth in relation to the outside diameter of the ring so that a notch does not necessary involve the same depth at every location. All notches extend directed radially towards the centre point of the light ring 1.

Finally, it is also possible to see in FIG. 2 an elevated projection 6 on the light ring 1, which engages into a corresponding recess in the housing 2 of the immobilizer and thereby forms a means for preventing the light ring from rotating.

It will be appreciated that the above-described embodiment of the lighting arrangement for the ignition lock of a motor vehicle has been set forth solely by way of example and illustration of the invention.

What is claimed is:

1. A lighting arrangement for an ignition lock of a motor vehicle including
   an electronic immobilizer having a housing;
   a light ring which comprises a light-guiding material and in use surrounds the ignition lock, the light ring defining a rear side;
   at least one light source disposed in the housing of the electronic immobilizer; and
   a first light-guide extension communicating the light source with the light ring, wherein the first light-guide extension opens substantially tangentially to the light ring.

2. The lighting arrangement according to claim 1, wherein the first light-guide extension includes a leg.

3. The lighting arrangement according to claim 2, wherein the leg is of circular cross-section.

4. The lighting arrangement according to claim 2, wherein the leg is of oval cross-section.

5. The lighting arrangement according to claim 2, wherein the leg of the light-guide extension has a primary leg and a secondary leg, the secondary leg branching off the primary leg in a proximity of the light ring.

6. The lighting arrangement according to claim 5, wherein the secondary leg opens into the light ring in the opposite direction to the primary leg.

7. The lighting arrangement according to claim 2, including a second light-guide extension.

8. The lighting arrangement according to claim 2, wherein the light ring has notches on the rear side for producing a light-dark pattern.

9. The lighting arrangement according to claim 8, wherein at least one of the depth and the position of the notches varies according to the distribution of light strength along the light ring to afford a substantially uniform emission of light along the light ring.

* * * * *